(12) United States Patent
Hamada

(10) Patent No.: US 6,981,036 B1
(45) Date of Patent: Dec. 27, 2005

(54) NETWORK DEVICE MANAGING APPARATUS AND METHOD

(75) Inventor: Noboru Hamada, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 855 days.

(21) Appl. No.: 09/588,672

(22) Filed: Jun. 6, 2000

(30) Foreign Application Priority Data

Jun. 11, 1999 (JP) .................................. 11-165569

(51) Int. Cl.$^7$ .......................................... G06F 15/173
(52) U.S. Cl. ...................... 709/223; 709/208; 709/222; 709/224; 709/220
(58) Field of Search ............................ 709/222, 223, 709/224, 208, 220

(56) References Cited

U.S. PATENT DOCUMENTS

| | | | | |
|---|---|---|---|---|
| 5,742,607 A | * | 4/1998 | Beighe et al. | 370/419 |
| 5,774,667 A | * | 6/1998 | Garvey et al. | 709/222 |
| 5,793,975 A | * | 8/1998 | Zeldin | 709/224 |
| 5,828,830 A | * | 10/1998 | Rangaraian et al. | 714/48 |
| 5,909,549 A | | 6/1999 | Compliment et al. | 395/200.53 |
| 5,996,010 A | * | 11/1999 | Leong et al. | 709/223 |
| 6,009,103 A | * | 12/1999 | Woundy | 370/401 |
| 6,021,429 A | * | 2/2000 | Danknick | 709/208 |
| 6,122,639 A | * | 9/2000 | Babu et al. | 707/103 R |
| 6,182,225 B1 | * | 1/2001 | Hagiuda et al. | 713/201 |
| 6,219,703 B1 | * | 4/2001 | Nguyen et al. | 709/224 |
| 6,256,322 B1 | * | 7/2001 | Wilson, Jr. | 370/469 |
| 6,330,600 B1 | * | 12/2001 | Matchefts et al. | 709/223 |
| 6,470,385 B1 | * | 10/2002 | Nakashima et al. | 709/224 |
| 6,560,644 B1 | * | 5/2003 | Lautmann et al. | 709/223 |
| 6,564,216 B2 | * | 5/2003 | Waters | 707/10 |

FOREIGN PATENT DOCUMENTS

| | | |
|---|---|---|
| EP | 0455402 | 11/1991 |
| EP | 0878935 | 11/1998 |
| EP | 0896454 | 2/1999 |
| EP | 1049291 | 11/2000 |
| JP | 11-053139 | 2/1999 |
| JP | 11-154950 | 6/1999 |

OTHER PUBLICATIONS

"Universal Plug and Play to Make Network Configuration Easy and Convenient for the Average Consumer", web page presented by Microsoft in 1999. <http:www.microsoft.com/presspass/feautures/1999/03-01_upnp.asap>.

M.T. Rose, "An Introduction to Management of TCP/IP-based Internets", 1991. (w/English Translation).

"Netware Programmer's Guide for C", Novell®. (w/English Translation).

T. A. Howes, et al., "LDAP Programming Directory-Enabled Applications with Lightweight Directory Access Protocol".

* cited by examiner

*Primary Examiner*—Nabil El-Hady
(74) *Attorney, Agent, or Firm*—Fitzpatrick, Cella, Harper & Scinto

(57) ABSTRACT

Each network device connected to a network broadcasts a cold start trap when activated. A monitoring device captures this trap and checks whether the trap is an SNMP packet. If the trap is an SNMP packet, the monitoring device extracts the address from the received packet and registers the address in a directory server, or requests the status of a device as a transmission source and registers the received status in the directory server.

35 Claims, 17 Drawing Sheets

FIG. 9
PRIOR ART

BOOL MIBOpen (int *port, ADDR ADDR * addr ) ;          901

BOOL MIBReadObjects (int port, int count, MIBOBJ *obj,   902
            CALLBACK respproc ) ;

BOOL MIBWriteObjects (int port, int count, MIBOBJVAL *objval,   903
            CALLBACK respproc ) ;

BOOL MIBClose (int port) ;          904 typedef VOID (*CALLBACK) (int port, ADDR *addr, INT result,   905
            int count, MIBOBJVAL *objval ) ;

NETWORK DEVICE MANAGING APPARATUS AND METHOD

FIELD OF THE INVENTION

The present invention relates to a network device managing apparatus and method of managing devices connected to, e.g., a computer network.

BACKGROUND OF THE INVENTION

Recently, a local area network (LAN) interconnecting computers is widely used. This local area network can be constructed on a floor of a building, in a whole building, across buildings (precincts), in a local region, or over a large area. Such networks can be further interconnected and connected to a worldwide network. These interconnected LANs sometimes have diverse hardware interconnecting technologies and several network protocols.

Each individual user can manage a separated simple LAN. That is, the user can change devices, install software, and diagnose problems.

On the other hand, a large-scale complicated LAN and a large group of interconnected LANs require "management". Commonly, "management" means management by both a human network manager and software used by the manager. In this specification, "management" means the one by software for managing the whole system, and a "user" means a person who uses network management software. This user is usually a person in charge of system management. The user can obtain and change management data on the network by using the network management software.

A large-scale network system is a dynamic system requiring continual addition and removal of devices, update of software, and detection of problems. Large-scale network systems include various systems owned by various persons and provided by various traders.

As a method of managing devices on networks constructing such a large-scale network system, a large number of standard organizations have made several attempts. An International Standardization Organization (ISO) has provided a versatile reference framework called an Open System Interconnection (OSI) model. The OSI model of a network management protocol is called a Common Management Information Protocol (CMIP). This CMIP is a common network management protocol in Europe.

In recent years, as a network management protocol having higher commonness, a Simple Network Management Protocol (SNMP) is available as a variety of the CMIP. ("Introduction to TCP/IP Network Management: Aiming at Practical Management", M. T. Rose/translated by Takeshi Nishida, K. K. Toppan, Aug. 20, 1992, 1st ed.)

In this SNMP network management technology, a network management system includes at least one network management station (NMS), several management objective nodes each containing an agent, and a network management protocol used by the network management station and agents to exchange management information. The user can obtain or change data on the network by communicating with agent software on a management objective node by using network management software on the NMS.

An agent is software running as a background process for each management objective node (target device). When the user requests a device on the network to send management data, the management software puts object identification information in a management packet or frame and sends it to the agent (target agent) of the target device. The agent interprets this object identification information, extracts data corresponding to the object identification information, and returns the data by assembling it in a packet to the user. To extract the data, a corresponding process is called in some cases.

Each agent holds data concerning its own state in the form of a database. This database is called a Management Information Base (MIB). FIG. 4 is a view showing the concept of the structure of this MIB. As shown in FIG. 4, the MIB has a tree data structure, and all nodes are uniquely numbered. Referring to FIG. 4, a number written in the parentheses of each node is the identifier of that node. For example, in FIG. 4, the identifier of a node 401 is 1. The identifier of a node 402 is represented as 1·3 because this node 402 is 3 below the node 401. Likewise, the identifier of a node 403 is represented as 1·3·6·1·2. This node identifier is called an object identifier.

This MIB structure is called a Structure of Management Information (SMI) and defined by RFC1155 Structure and Identification of Management Information for TCP/IP-based Internets.

FIG. 4 shows only a part of the MIB defined as a standard.

The SNMP will be briefly described below. A PC (to be referred to as a manager hereinafter), in which network management utility software is operating, and a management objective network device (to be referred to as an agent hereinafter), in which an SNMP agent is operating, communicate with each other by using the SNMP. This SNMP has five types of commands called Get-request, Get-next-request, Get-response, Set-request, and Trap. FIG. 8 shows the way in which these commands are exchanged between the manager and the agent.

Get-request and Get-next-request are commands which are sent from the manager to the agent to acquire the value of an MIB object of the agent. Upon receiving these commands, the agent sends the Get-response command to the manager to inform the manager of the MIB value (801 and 802).

Set-request is a command which is sent from the manager to the agent to set the value of the MIB object of the agent. Upon receiving this command, the agent sends the Get-response command to the manager to inform the manager of the set result (803).

Trap is a command which is sent from the agent to the manager to inform the manager of a change in the state of the agent (804).

FIG. 7 shows the formats of commands except Trap, i.e., the formats of Get-request, Get-next-request, Get-response, and Set-request.

700 indicates an SNMP message. This SNMP message 700 includes a version 701, a community name 702, and an area 703 called a PDU 710 shows details of this PDU 703. The PDU 710 includes a PDU type 711, request ID 712, error status 713, error index 714, and MIB information 715. The PDU type 711 stores a value for identifying the command. That is, if the value of this field is 0, 1, 2, or 3, the command is Get-request, Get-next-request, Get-response, or Set-request. The error status 713 stores a value indicating error information. If there is no error, the value in this field is 0. The MIB information 715 stores a pair of an object ID and its value.

A large-scale network requiring management will be described below.

FIG. 1 is view showing a large-scale network in which a network board (NB) 101 for connecting with a network is connected to a printer 102 having an open architecture and this printer 102 is connected to a LAN via the network board 101. The NB 101 is connected to a local area network (LAN) 100 via a LAN interface such as the Ethernet Interface 10Base-2 having a coaxial connector or the 10Base-T having RJ-45.

A plurality of personal computers (PCs) such as a PC 103 and a PC 104 are also connected to the LAN 100. These PCs can communicate with the NB 101 under the control of a network operating system. One of these PCs, e.g., the PC 103 can be designated as a network manager. A local printer, such as a printer 105 connected to the PC 104, can be connected to a PC.

Furthermore, a file server 106 is connected to the LAN 100 to manage access to files stored in a network disk 107 having a large capacity (e.g., 10 gigabytes). A print server 108 causes printers, such as connected printers 109a and 109b and the printer 105 in a remote place, to perform printing. Other peripheral devices (not shown) can also be connected to this LAN 100.

More specifically, in the network shown in FIG. 1, network software such as Novell or Unix software can be used to efficiently perform communications between various network members. It is possible to use any network software, e.g., the NetWare (trademark of Novell Corp.; this will be omitted hereinafter) of Novell Corp. A detailed explanation of this software package is made in on-line documentation of the NetWare package. This can be purchased together with the NetWare package from Novell Corp.

The arrangement shown in FIG. 1 will be briefly described below. The file server 106 functions as a file manager for receiving, storing, queuing, caching, and transmitting data files between LAN members. For example, data files formed by the PCs 103 and 104 are transmitted to the file server 106. The file server 106 arranges these data files in order and, in accordance with a command from the print server 108, transmits the arranged data files to the printer 109a.

Each of the PCs 103 and 104 is a common PC capable of forming a data file, transmitting the formed data file to the LAN 100, receiving a file from the LAN 100, and displaying and/or processing such files. Although personal computers are shown in FIG. 1, other computers suited to executing the network software can also be included. For example, when UNIX software is used, UNIX workstations can be included. These workstations can be used together with the PCs shown in FIG. 1 under appropriate conditions.

Commonly, a LAN such as the LAN 100 provides services to a somewhat local user group, e.g., a user group on one floor, or across a plurality of consecutive floors, in one building. For example, when a certain user is away from other users, such as when a user exists in another building or in another prefecture, a wide area network (WAN) can be constructed. The WAN is basically a group formed by connecting a plurality of LANs by high-speed digital lines such as high-speed integrated services digital network (ISDN) telephone lines. Accordingly, as shown in FIG. 1, the LAN 100, a LAN 110, and a LAN 120 form a WAN as they are connected via a modem/transponder 130 and backbone 140. These connections are simple electrical connections using several buses. Each LAN includes dedicated PCs and usually includes a file server and a print server although they are not always necessary.

As shown in FIG. 1, therefore, the LAN 110 includes PCs 111 and 112, a file server 113, a network disk 114, a print server 115, and printers 116 and 117. In contrast, the LAN 120 includes only PCs 121 and 122. Devices connected to any of these LANs 100, 110, and 120 can access functions of devices of the other LANs via the WAN connections.

As an example of the form of installation of an agent, an agent can be installed in a network board for connecting a printer to a network. This allows the printer to be managed by the network management software. The user can obtain information of, or change the state of, a printer to be controlled by using the network management software. More specifically, the user can acquire character strings displayed on a liquid crystal display of a printer or can change the default paper feed cassette. A system in which a network board (NB) including an agent is connected to a printer will be described below. As shown in FIG. 2, the NB 101 is preferably incorporated into an internal expansion I/O slot to serve as an "embedded" network node having the following process and data storage functions. The configuration of this NB 101 gives the advantage of having characteristic auxiliary functions for controlling and managing a large multi-area WAN. These auxiliary functions include: printer control and status observation from a remote place (e.g., an office of a network manager) on the network; automatic management of the printer configuration for providing the guaranteed initial environment for the next user after each print job; and a printer log and use statistics which characterize the printer load amount and enables access via the network to set a toner cartridge exchange schedule.

An important factor in designing this NB is a function of accessing the printer control status from the NB 101 via a bidirectional interface such as a shared memory. Instead of a shared memory, an interface such as a SCSI interface can also be used. This permits printer operation information to be transmitted to the NB 101 or to an external network node so that a number of convenient auxiliary function programs are formed. Printing image data and control information blocks are formed by a microprocessor on the NB 101, described in the shared memory, and loaded by the printer 102. Analogously, printer status information is supplied from the printer 102 to the shared memory and loaded by the NB processor.

FIG. 2 is a sectional view showing the state in which the NB 101 is installed in the printer 102. As shown in FIG. 2, this NB 101 comprises a printed circuit board 101a having a faceplate 101b for connecting with the network, and is connected to a printer interface card 150 via a connector 170. This printer interface card 150 directly controls the printer engine of the printer 102. Printing data and a printer status command are input from the NB 101 to the printer interface card 150 via the connector 170. Printer status information is obtained from the printer interface card 150 via the connector 170. The NB 101 communicates this information on the LAN 100 via a network connector of the faceplate 101b. Simultaneously, the printer 102 can receive printing data from a conventional serial port 102a and parallel port 102b.

FIG. 3 is a block diagram showing the electrical connections between the NB 101, the printer 102, and the LAN 100. The NB 101 is connected to the LAN 100 via the LAN interface and to the printer 102 via the printer interface card 150. This NB 101 includes a microprocessor 301 for controlling the NB 101, a ROM 303 storing operation programs of the microprocessor 301, a RAM 302 which the microprocessor 301 uses as a work area to execute the programs, and a shared memory 200 by which the NB 101 and the printer interface card 150 exchange data. These components are interconnected by an internal bus. The ROM 303 stores a program which allows the NB 101 to operate as an SNMP agent. The microprocessor 301 operates in accordance with the programs stored in the ROM 303 and uses the RAM 302 as a work area. Also, the microprocessor 301 uses the shared memory 200 as a buffer area for communicating with the printer interface card 150.

A microprocessor 151 on the printer interface card 150 accesses data of the NB 101 via the shared memory 200 of the NB 101. This microprocessor 151 on the printer interface card 150 also communicates with a printer engine 160 which actually operates a printing mechanism.

A PC on which the network management software operates will be described below.

FIG. 5 is a block diagram showing the arrangement of a PC on which the network management software can operate.

Referring to FIG. 5, a PC 500 is a PC on which the network management software operates, and is equivalent to the PC 103 shown in FIG. 1. This PC 500 includes a CPU 501 which executes a network management program stored in a ROM 502 or in a hard disk (HD) 511 or supplied from a floppy disk drive (FD) 512, thereby generally controlling individual devices connected to a system bus 504.

A RAM 503 functions as a main memory and work area for the CPU 501.

A keyboard controller (KBC) 505 controls input instructions from a keyboard (KB) 509, a pointing device (not shown), and the like. A CRT controller (CRTC) 506 controls the display of a CRT display (CRT) 510. A disk controller (DKC) 507 controls access to the hard disk (HD) 511 and floppy disk controller (FD) 512 storing a boot program, various applications, edit files, user files, and the network management program. A network interface card (NIC) 508 bidirectionally exchanges data with agents or network devices via the LAN 100.

The configuration of the network management software in the prior art will be described next.

A network management apparatus of this prior art is realized on a PC having the same configuration as the PC capable of realizing the network management apparatus as shown in FIG. 5. The hard disk (HD) 511 stores a program of the network management software according to the application concerned, which is the main part of operation in the entire explanation to be described later. In the entire explanation described later, the main hardware part of execution is the CPU 501 unless otherwise specified. On the other hand, the main software part of control is the network management software stored in the hard disk (HD) 511. In this prior art, Windows 95 (Microsoft Corp.) is assumed as an OS. However, an OS is not particularly limited.

The network management program according to the application concerned can also be supplied as it is stored in a storage medium such as a floppy disk or a CD-ROM. In this case, the program is read out from the storage medium by the floppy disk controller (FD) 512 shown in FIG. 5 or a CD-ROM driver (not shown) and installed in the hard disk (HD) 511.

FIG. 6 is a view showing the module configuration of the network management software according to this prior art. This network management software is stored in the hard disk 511 shown in FIG. 5 and executed by the CPU 501. During the execution, the CPU 501 uses the RAM 503 as a work area.

Referring to FIG. 6, a device list module 601 displays a list of devices connected to the network. The way in which this list is displayed will be described later with reference to FIG. 15. A system control module 602 controls other modules in accordance with instructions from the device list. A configurator 603 is a module which performs special processing pertaining to network settings of an agent. A search module 604 searches for a device connected to the network. Devices found by this search module 604 are displayed in the form of a list by the device list 601. A NetWare job module 605 acquires the status of a print job from the network server by using a NetWare API 616. Note that this NetWare API is described in, e.g., "NetWare Programmer's Guide for C" issued by Novell Corp. This book can be purchased from Novell Corp. User interface (UI) modules 606 and 607 display device detail windows (to be described later). These UI modules exist in a one-to-one correspondence with devices whose detailed information is to be displayed. Control modules 608 and 609 perform control unique to a device from which detailed information is to be acquired. Like the UI modules, these control modules exist in one-to-one correspondence with devices whose detailed information is to be displayed. The control A module 608 and the control B module 609 acquire MIB data from a management objective device by using an MIB handling module 610 and transfer the data to the UI A module 606 and the UI B module 607, respectively. Note that the MIB handling module 610 will be simply referred to as an MIB module hereinafter.

This MIB module 610 converts an object identifier and an object key. The object key is a 32-bit integer having a one-to-one correspondence with an object identifier. The object identifier is a variable-length identifier which is difficult to handle in installing the network management software. Hence, in the network management software according to the application concerned, a fixed-length identifier having a one-to-one correspondence with this object identifier is internally used. Higher-order modules than this MIB module 610 process MIB information by using this object key. This facilitates installing the network management software.

An SNMP module 611 transmits and receives SNMP packets.

A common transport module 612 absorbs the difference of a low-order protocol for transporting SNMP data. In practice, one of an IPX handler 613 and a UDP handler 614 transfers data in accordance with a protocol chosen by the user before operation. As the UDP handler, WinSock 617 is actually installed. (The WinSock is described in, e.g., the manual of Windows socket API v1.1. This document is obtainable from a plurality of places, e.g., packaged in Visual C++ as a compiler available from Microsoft Corp.)

A current protocol 615 used by the configurator 603 is one of the IPX protocol and the UDP protocol chosen by the user before operation.

An interface between the search module 604 and the MIB module 610 used in this prior art will be described below.

The MIB module 610 provides an API (Application Program Interface) described in C language shown in FIG. 9 to a high-order module.

Initially, the high-order module calls an MIBOpen API 901 to open an interface (called a port) corresponding to the designated address between this high-order module and the MIB module. The MIB module returns an identifier (called a port identifier) for identifying the open interface to the high-order module. This port identifier is returned to a first argument, port, of the MIBOpen API 901. After that, the high-order module exchanges data with the MIB module by using the port identifier.

The address (ADDR) designated here is the address of an operating protocol, i.e., an IP address when the IP protocol is operating and a NetWare address when the NetWare protocol is operating. A broadcast address can also be designated.

If the port is opened by designating a broadcast address, the high-order module can communicate with a plurality of devices responding to this broadcast address.

When the high-order module does not use the port any longer, the module closes the port by calling an MIBClose API 904.

To read out an MIB object, the high-order module calls an MIBReadObjects API 902. To call this MIBReadObjects API 902, the high-order module designates a port identifier and the object key of the MIB object to be read out and also designates the address of a callback function by which the MIB module informs the host of the readout MIB object value.

When the MIBReadObjects API 902 is called, a Get-request command of the SNMP is generated and transmitted onto the network. As shown in FIG. 8, a device having an agent responding to this Get-request command transmits a Get-response command.

To write data in an MIB object, the high-order module calls an MIBWriteObjects API 903. To call this MIBWriteObjects API 903, the high-order module designates a port identifier and the object key and value of the MIB object to be written and also designates the address of a callback function by which the MIB module informs the host of the result of the write operation.

When the MIBWriteObjects API 903 is called, a Get-request command of the SNMP is generated and transmitted onto the network. As shown in FIG. 8, a device having an agent responding to this Get-request command transmits a Get-response command.

The callback function informs the high-order module of the result of the MIBReadObjects API 902 or the MIBWriteObjects API 903. More specifically, the callback function informs the host of the device address and the contents of the received Get-response command.

When the MIBReadObjects API 902 is called for a port opened by designating a broadcast address, the destination address of a packet (an IP packet for the IP protocol and an IPX packet for the NetWare protocol) for carrying the Get-request command transmitted onto the network is the broadcast address. Since, therefore, this packet is received by a plurality of devices, a plurality of devices respond to the Get-request command. That is, the manager receives a plurality of Get-response commands. In this case, the callback function performs calling a plurality of times by using the same port identifier and different device addresses. The high-order module can identify a device from which the callback is transmitted by checking the address information.

A practical data flow will be described below. In accordance with a request from the host, the MIB module 610 performs processing such as conversion from the object key to the object ID and sends a command transmission request to the SNMP module 611. Upon receiving this transmission request from the MIB module 610, the SNMP module 611 assembles SNMP PDU on the RAM 503 and sends a transmission request to the common transport module 612. The common transport module 612 performs predetermined processing such as addition of the header by using the operating protocol, and sends a packet transmission request to the WinSock module 617 if the operating protocol is the TCP/IP protocol, or to the NetWare API module 616 if the operating protocol is the NetWare protocol. In the following explanation, it is assumed that the operating protocol is the TCP/IP protocol. The WinSock module 617 converts the packet whose transmission is requested into an IP packet, and requests the OS to transmit the data onto the network. The OS writes the data on the RAM 503 into the NIC 508 via the system bus 504. The NIC 508 converts the written data into a predetermined frame and transmits the frame to the LAN 100.

A packet from a device connected to the LAN 100 is received by the NIC 508. This NIC 508 informs the OS of the packet reception by an interrupt. The OS reads out the received packet from the NIC 508 via the system bus 504 and places the readout packet in the RAM 503. The OS informs the WinSock module 617 or the NetWare API module 616 of the packet reception if the operating protocol, or the protocol determined from the received packet, is the TCP/IP protocol or the NetWare protocol. In the following explanation, it is assumed that the operating protocol is the TCP/IP protocol. The WinSock module 617 checks whether the received packet is addressed to itself on the basis of the address in the received packet. If the received packet is not addressed to itself, the WinSock module 617 discards the received packet. If the received packet is addressed to itself, the WinSock module 617 activates the UDP handler 614 to inform the common transport module 612 of the packet reception. The common transport module 612 performs predetermined processing such as removal of the transport header and informs the SNMP module 611 of the packet reception. The SNMP module 611 performs predetermined processing such as removal of the SNMP header and informs the MIB module of the PDU reception. The MIB module 610 performs predetermined processing, converts the received information into a form specified by MIB API, and calls the callback function of the high-order module, thereby informing the high-order module of the response from the device.

In the following description, the network management software according to the application concerned will be referred to as "NetSpot".

Files necessary to install the NetSpot are usually distributed as they are recorded on a physical medium such as a floppy disk (FD) or a CD-ROM, or transmitted via the network. The user obtains these files necessary to install the NetSpot by such means and starts installing the NetSpot in accordance with a predetermined install procedure.

The NetSpot install procedure is similar to install procedures of other general software. That is, when the user activates the NetSpot installer on a personal computer (PC), this installer automatically executes installation. The installer copies files required for operation of the NetSpot into the hard disk of the PC and, while allowing the user to input information as needed, corrects files or forms new files necessary for operation of the NetSpot.

A search sequence in the network management program of this prior art will be described below.

FIG. 10 is a view showing the search sequence in this conventional network management program.

Referring to FIG. 10, a search module 1030 is a search module of the network management program and is equivalent to 604 in FIG. 6. Similar to other modules of the network management program, this search module is executed by the CPU 501 shown in FIG. 5 on the PC 103 shown in FIG. 1.

A device 1031 is a device which is connected to the network, in which an SNMP agent is operating, and which is equipped as a printer with only a standard MIB. An example is an NB 118 shown in FIG. 1. A standard MIB is an MIB prescribed by RFC1213, RFC1514, and RFC1759.

A device 1032 is a device which is connected to the network, in which an SNMP agent is operating, and which is equipped as a printer with a standard MIB and a private MIB unique to the corporation. An example is the NB 101 shown in FIG. 1. In this prior art, it is assumed that the NB 101 mounts the private MIB unique to the corporation. This private MIB unique to the corporation is an MIB object below the canon node indicated by the node 408 in FIG. 4.

When a high-order module issues a search start instruction, this search module 1030 designates a broadcast address and sends a Get-request SNMP packet for acquiring the device status and the device type to the network (1001 and 1002). This packet is delivered to all devices connected to the network.

As an MIB object to be inquired, a message 1001 in FIG. 10 uses only the standard MIB, and a message 1002 uses the private MIB. Different MIB objects are inquired to find both devices equipped with the private MIB and devices equipped with only the standard MIB.

In response to this SNMP packet, each network device having the SNMP agent sends a response packet (messages 1003 to 1006).

The message 1003 is the response from a device 1031 to the broadcast packet 1001 inquiring the standard MIB, by which a value corresponding to the status of the device 1031 is returned. The message 1004 is the response from a device 1032 to the broadcast packet 1001 inquiring the standard MIB, by which a value corresponding to the status of the device 1032 is returned. The message 1005 is the response from the device 1031 to the broadcast packet 1002 inquiring the private MIB. Since the device 1031 does not mount the private MIB, noSuchName is returned as an error. The message 1006 is the response from the device 1032 to the broadcast packet 1002 inquiring the private MIB, by which a value corresponding to the status of the device 1032 is returned.

When a predetermined time has elapsed from the start of search, a primary response timer 1023 expires. Therefore, to acquire more detailed information, the search module 1030 transmits an SNMP packet to each device.

More specifically, the device 1031 has returned the noSuchName error with respect to the private MIB before the primary search timer 1023 expires. Therefore, by regarding this device which has returned the error as a device not corresponding to the private MIB, i.e., as a device corresponding only to the standard MIB, more detailed information is acquired using the standard MIB. This acquisition and the response from the device 1031 are messages 1007 and 1008, respectively.

Likewise, the device 1032 has returned normal responses to both the standard MIB and the private MIB. Hence, by regarding this device as mounting the private MIB, more detailed information is acquired using the private MIB.

This acquisition and the response from the device 1032 are messages 1009 and 1010, respectively.

When the time further elapses and a device response timer 1021 expires, the high-order module is informed of the information of the devices searched up to the point.

When the time further elapses and a search interval timer 1022 expires, the search module 1030 restarts searching. The sequence is exactly the same as the operation described above, so a detailed description thereof will be omitted.

In this prior art as described above, the device managing apparatus searches for devices by actively transmitting broadcast packets to the network.

When broadcast packets are thus transmitted, all network devices capable of responding to the SNMP transmit return packets to the broadcast packets. This significantly increases the traffic of the network. Periodic transmission of broadcast packets means periodic occurrence of the traffic increasing phenomenon caused by the broadcast packets. A situation like this is unpreferable from network load and management viewpoints. Transmission of broadcast packets is desirably as less as possible.

SUMMARY OF THE INVENTION

The present invention has been made in consideration of the above prior art, and has as its object to provide a network device managing apparatus and method capable of acquiring information of a network device without increasing the load of a network.

To achieve the above object, the present invention has the following arrangement. That is, an apparatus for managing a network to which a device which broadcasts a network managing packet at least once after activation is connected, comprises packet receiving means for receiving a packet, packet determining means for determining whether the packet received by the packet receiving means is a network managing packet, device address acquiring means for acquiring from the packet the address of a device which has transmitted the packet, if the packet determining means determines that the packet is a network managing packet, and device address registering means for registering the device address.

Another apparatus for managing a network to which a device which broadcasts a network managing packet at least once after activation is connected, comprises packet receiving means for receiving a packet, packet determining means for determining whether the packet received by the packet receiving means is a network managing packet, transmitting means for transmitting to a device which has transmitted the packet a verify packet for verifying that the device is an object of monitoring, if the packet determining means determines that the received packet is a network managing packet, and device address registering means for registering, on the basis of a response to the verify packet, the status of the device which has returned the response together with the address.

Preferably, the response is a normal response if a device as the response source is an object of management, and contains information indicating the operating state of the device.

Preferably, the transmitting means transmits a verify packet for acquiring the status of a printer, and, if a response to the verify packet is a normal response, the address registering means registers information indicating that the device is a printer together with the address of the device as a response source.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 9 is a view showing an MIB module API;

DETAILED DESCRIPTION OF THE PREFERRED EMBODIMENTS

First Embodiment

As described in the explanation of the prior art, the SNMP definitions have a command called a trap. This trap includes several types, and one of them is called a cold start trap which is broadcast to a network when a device is activated. In the present invention, addition of a new device to the network is detected by capturing this cold start trap.

The present invention will be described in detail below with reference to the accompanying drawings.

Figure 11:
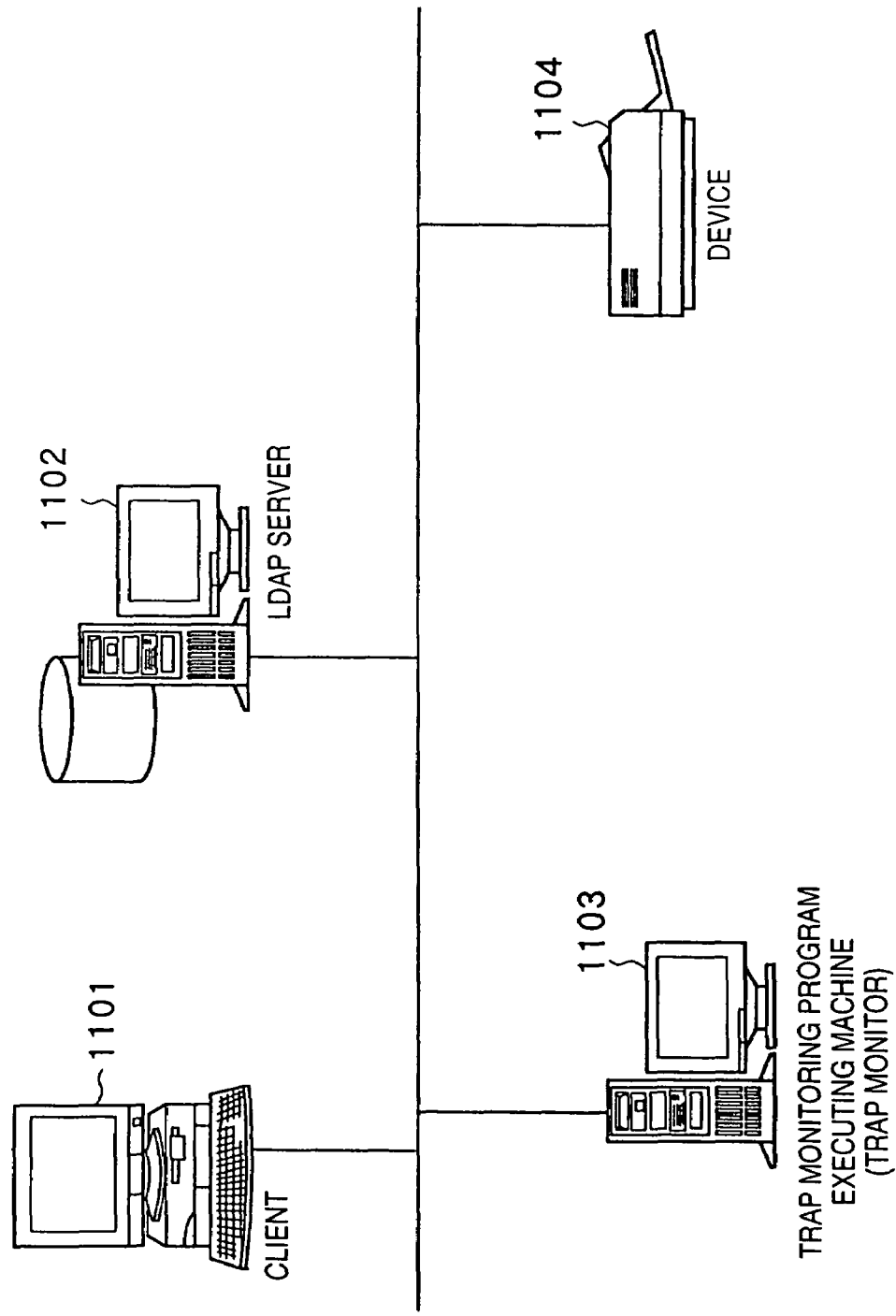
FIG. 11 is a view showing the arrangement of devices on a network.

FIG. 11 is a view showing the arrangement of various devices on a network.

A computer 1101 executes a network device management program. A directory service is operating in a directory server 1102. A trap monitoring program executing machine 1103 monitors a trap packet. This trap monitoring program executing machine will also be simply referred to as a trap monitor hereinafter. The configurations of these computers 1101, 1102, and 1103 can be identical with that shown in FIG. 5 in the explanation of the prior art. However, in the directory server 1102 and the trap monitor 1103, I/O devices for communicating with the user, such as a keyboard controller 505, keyboard 509, CRT controller 506, and CRT 510, are not always necessary. These computers 11101, 1102, and 1103 can also be single computers.

The directory service is a so-called telephone directory pertaining to the network and stores various pieces of information. A practical example of the directory system is the LDAP (Lightweight Directory Access Protocol). The definitions of this LDAP are described in RFC1777 issued by IETF. An example of a manual is "LDAP Internet Directory Application Programming" issued by Prentice-Hall, Nov. 1, 1997.

In this embodiment, it is assumed that an LDAP server is used as the directory server. However, the essence of the present invention is not impaired by a directory server other than the LDAP server.

Figure 12:
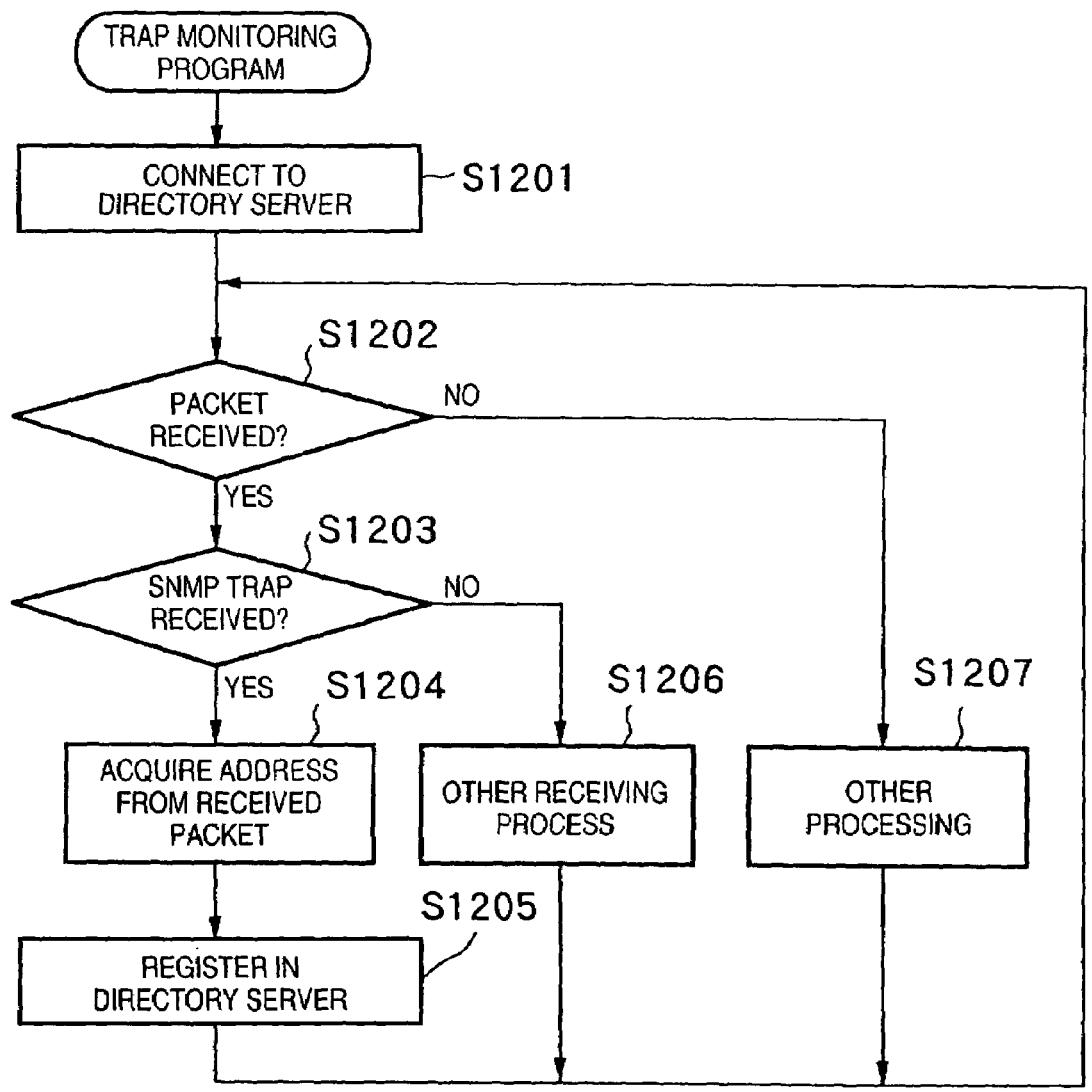
FIG. 12 is a flow chart showing the operation of a trap monitoring program.

FIG. 12 is a flow chart showing the operation of a trap monitoring program which operates in the trap monitor 1103. Assume that this trap monitoring program is so set as to be activated at the same time the trap monitor 1103 is activated or is explicitly activated by the manager of the network. Assume also that the trap monitoring program executing machine 1103 has the arrangement shown in FIG. 5.

Figure 7:
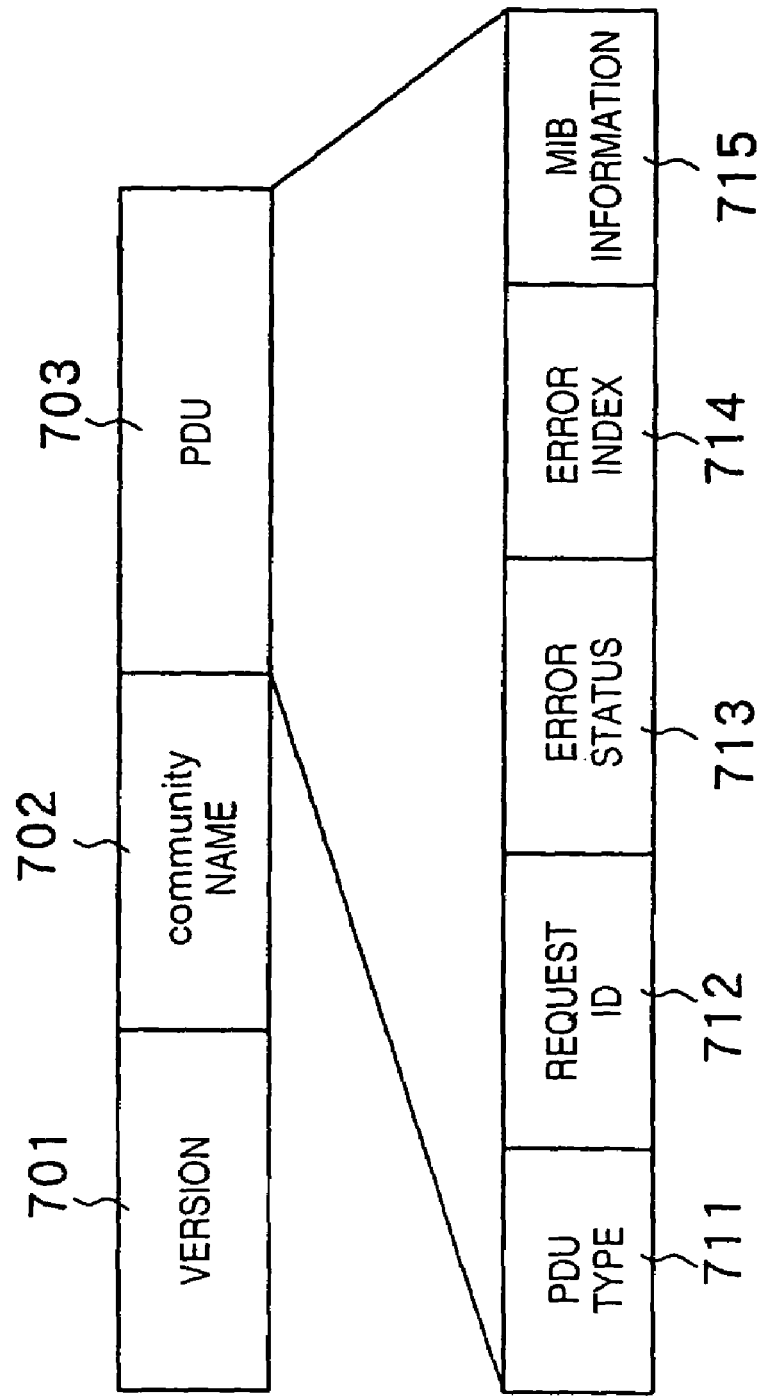
FIG. 7 is a view showing the format of an SNMP message.
Figure 8:
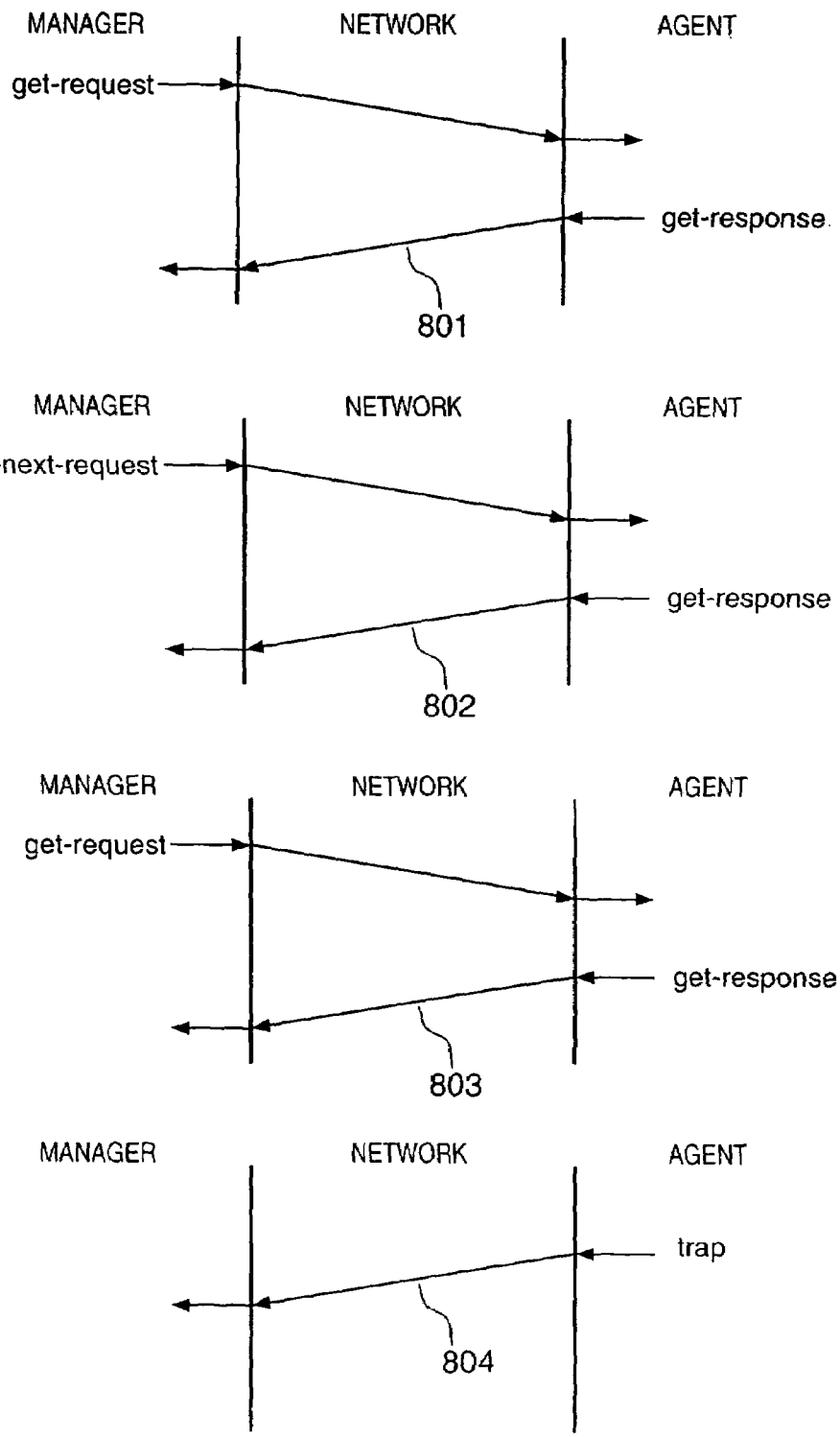
FIG. 8 is a view showing exchange of SNMP commands between a manager and an agent.
Figure 10:
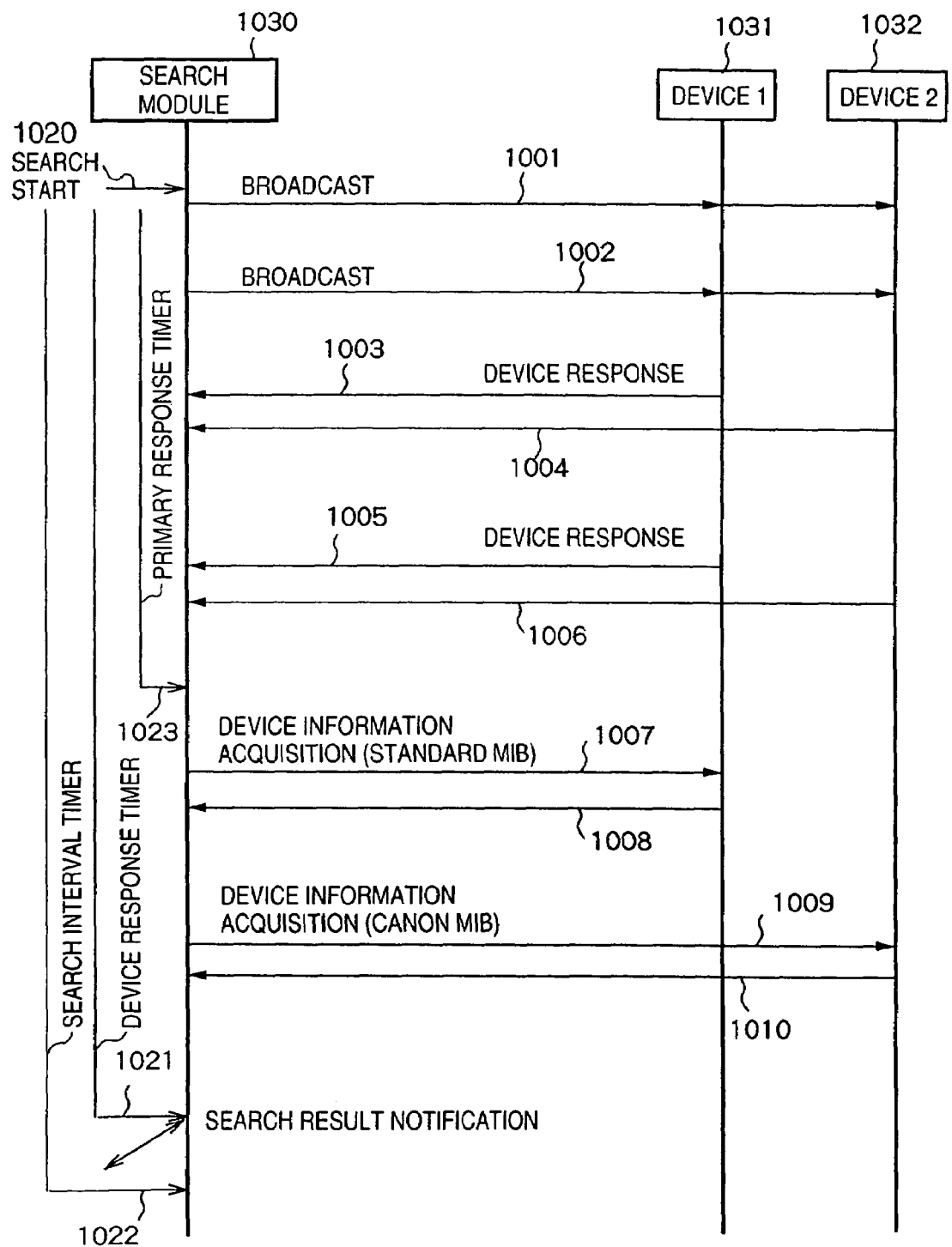
FIG. 10 is a view showing a communication sequence between a search module and devices in the prior art.

In this trap monitoring program, in step S1201 the machine is connected to the directory server 1102 via the network to prepare for registration of information. Assume that the address to be connected of the directory server is previously registered by the system manager, and this address is recorded in, e.g., a file and stored in a hard disk 511. In step S1202, whether a packet is received is checked. This is done by checking for the status of a NIC 508 by the OS by calling an API provided by the OS. If a packet is received, the flow advances to step S1203 to check whether the received packet is an SNMP trap. If the format of the received packet is consistent with the SNMP packet explained in FIG. 7 and the field value of a PDU type 711 indicates a trap, it is determined that the received packet is an SNMP trap packet. If it is determined in step S1203 that the received packet is an SNMP packet, the flow advances to step S1204. In step S1204, the address of a transmission source device is extracted by checking the transmission source address field of the received packet. The flow then advances to step S1205 to transmit the address of the device extracted in step S1204 to the directory server 1102 and register the address in the directory service.

On the other hand, if it is determined in step S1203 that no SNMP trap is received, the flow advances to step S1206 to perform a receiving process other than SNMP trap reception. Alternatively, if it is determined in step S1202 that no packet is received, the flow advances to step S1207 to perform processing other than packet reception.

When the processing in step S1205, S1206, or S1207 is completed, the flow returns to step S1202 to continue the process.

Figure 13:
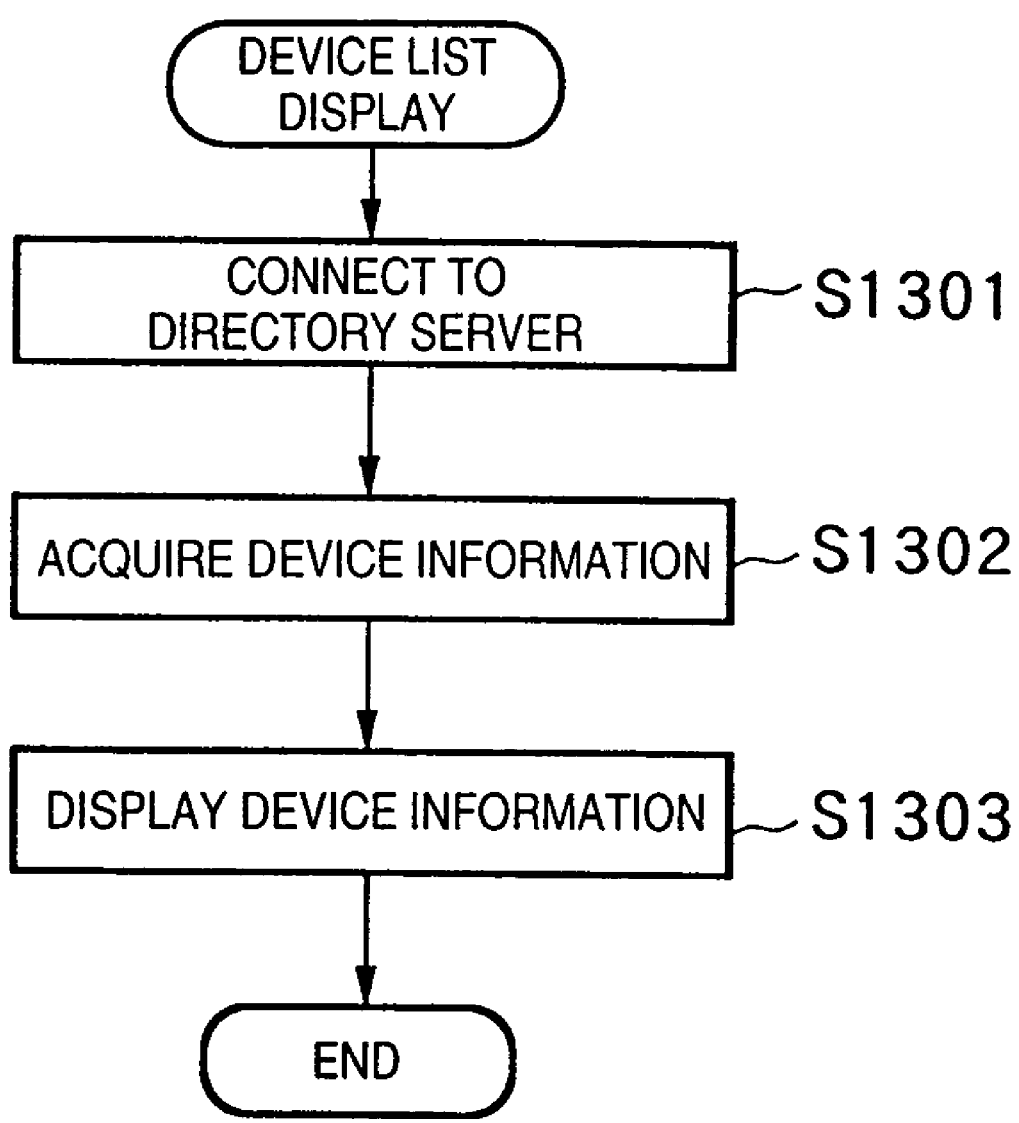
FIG. 13 is a flow chart showing an operation of displaying a device list.

FIG. 13 is a flow chart showing an operation of displaying a device list in the device control program executed by the client 1101. This procedure shown in FIG. 13 is activated when the device management program is activated by the client 1101, or is explicitly activated by operation by the user.

In this device list display operation, in step S1301 the machine is connected to the directory server. Assume that the address to be connected of the directory server is previously registered by the system manager, and this address is recorded in, e.g., a file and stored in the hard disk 511. This address is the same as the address of the directory server with which the trap monitoring program connects. In step S1302, information registered in the directory service is extracted from the directory server connected in step S1301. In step S1303, the CRTC 506 is operated to display the information acquired in step S1302 on the CRT 510.

Figure 14:
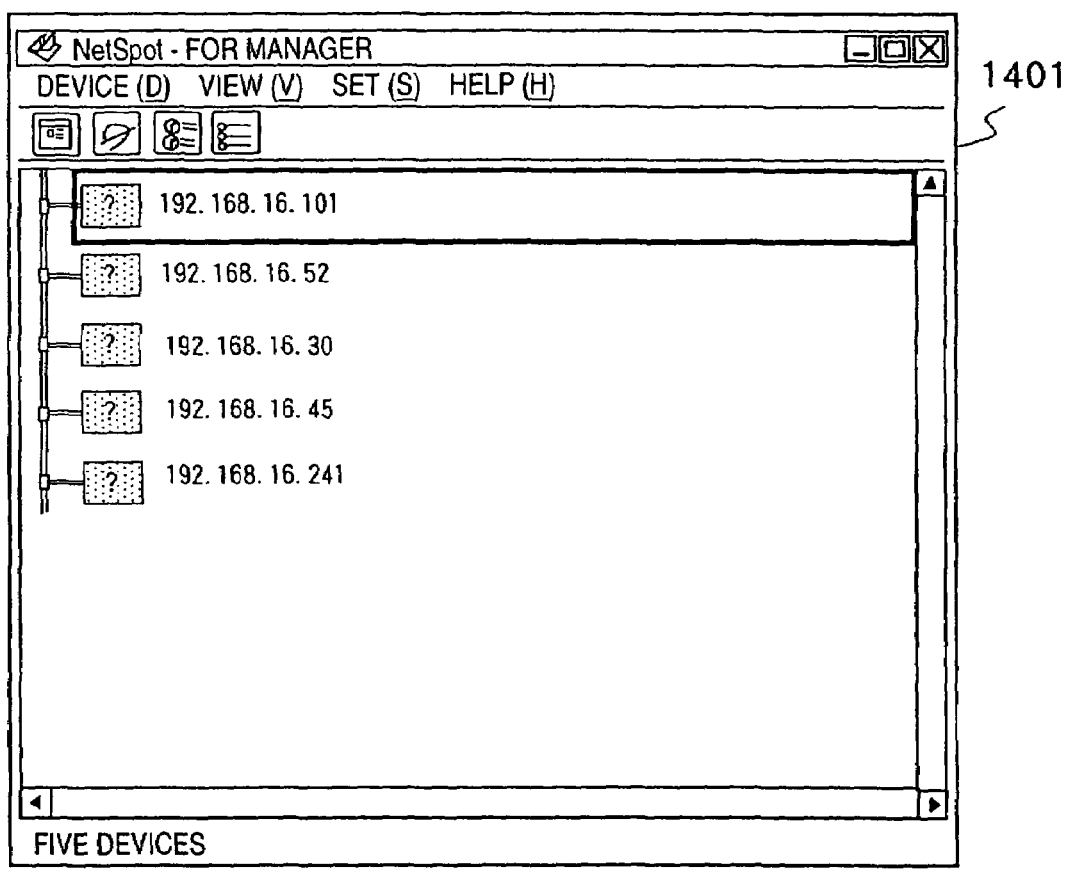
FIG. 14 is a view showing the way the device list is displayed.

FIG. 14 is a view showing the way the information is displayed in step S1303. A list of the addresses of devices acquired from the directory server is displayed in a window 1401.

As described above, the trap monitoring program captures a cold start trap which a device on the network broadcasts upon activation, acquires the address of the device, and registers the address in the directory server. This allows the device managing apparatus to grasp the addresses of devices connected to the network by referring to the addresses of these devices registered in the directory server, without actively searching for these devices. This obviates the need for any active search packet issue by the device managing apparatus and thereby reduces the traffic of the network.

Second Embodiment

A trap packet is a common packet in device management by the SNMP. Therefore, it is convenient if a trap monitor 1103 registers a captured trap packet in directory service after verifying that the packet is from a device type to be searched for, since a client accesses the directory service later. That is, if the client intends to control only a network printer, it is more desirable that a trap packet be registered in the directory service after it is verified that the device which has transmitted this packet is a printer.

Furthermore, when the trap monitor 1103 receives a trap packet, more detailed information about a device can be obtained by using a packet for inquiring the status of the device as a packet for checking for the device type.

The object of the second embodiment of the present invention is to improve these respects.

In this second embodiment, it is assumed that a network device to be controlled is a network printer.

Figure 15:
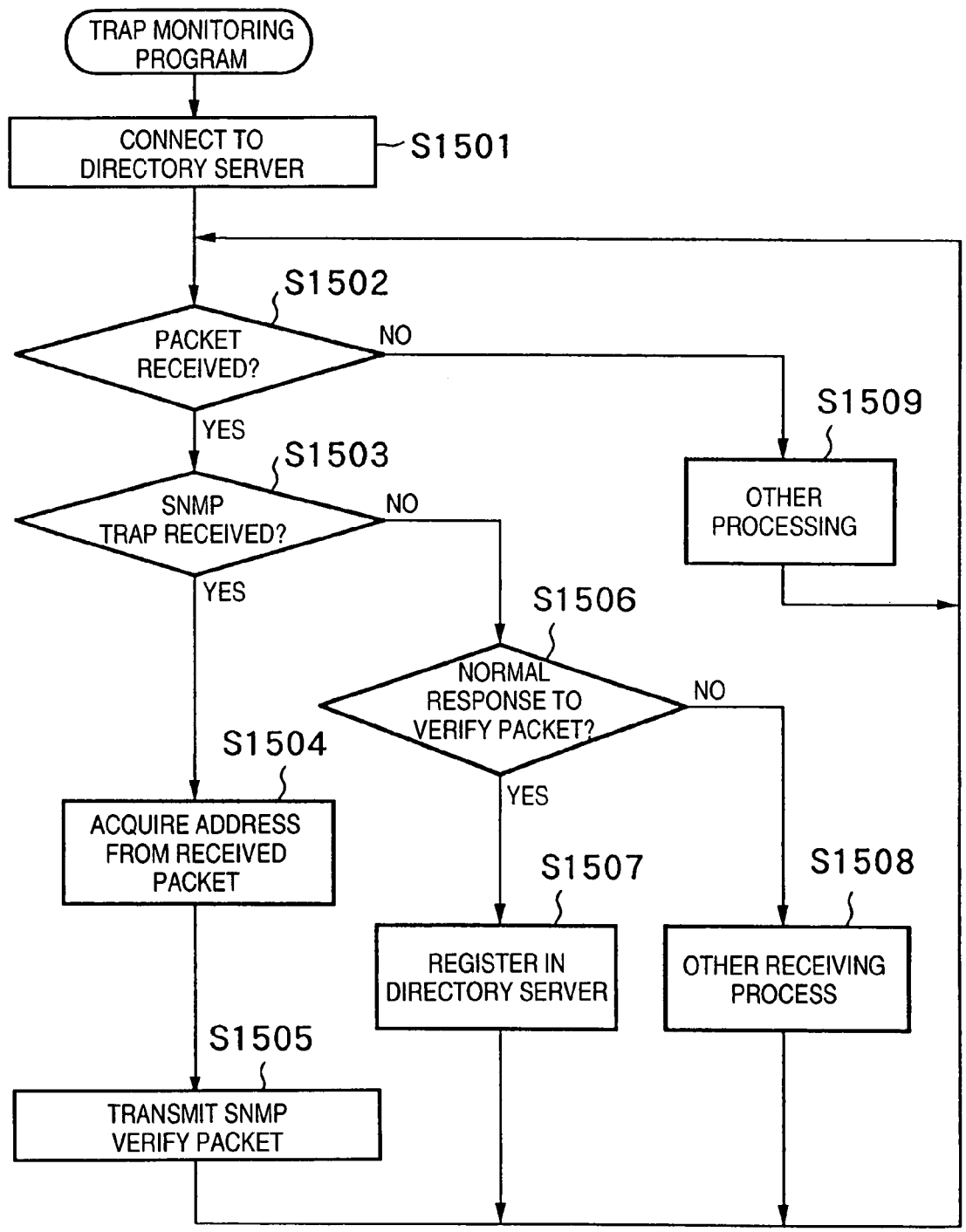
FIG. 15 is a flow chart showing the operation of a trap monitoring program in the second embodiment.

FIG. 15 is a flow chart for explaining the operation of a trap monitoring program executed by the trap monitor 1103.

Referring to FIG. 15, steps S1501 to S1504 are exactly the same as steps S1201 to S1204 explained with reference to FIG. 12 in the first embodiment, so a detailed description thereof will be omitted. Similarly, steps S1508 and S1509 are the same as steps S1206 and S1207, respectively, and a detailed description thereof will be omitted.

By the procedure in steps S1501 to S1504, a trap command is received and an address is acquired from this packet. In step S1505, to verify that a device which has transmitted the trap packet is a network printer, an SNMP packet for acquiring an MIB object assumed to be implemented by a network printer is transmitted. More specifically, a Get-next-request packet is transmitted to the network printer in order to acquire, e.g., hrPrinterDetectedErrorState defined in RFC1514 Host Resources MIB. This MIB object represents the status of a printer. By the use of this MIB object as information for inquiring of a device, it is possible to verify that the device is a printer and simultaneously obtain more detailed information about the device.

On the other hand, if it is determined in step S1503 that the received packet is a packet other than an SNMP trap, the flow advances to step S1506 to check whether the packet is an SNMP packet and is a normal response indicating a network printer. More specifically, if the value of a Get-next-request packet request ID field 712 (FIG. 7) transmitted in step S1505 is equal to the value of the received packet, the received packet is a Get-response packet corresponding to the Get-next-request packet transmitted in step S1505. At the same time, it is checked whether the object ID of the acquired MIB contained in an MIB information field 715 of the received packet is hrPrinterDetectedErrorState.X. X is an index value which indicates a printer device in an MIB agent of the device which has transmitted the trap packet.

If the object ID of the acquired MIB is hrPrinterDetectedErrorState.X, it is determined that the device which has transmitted the trap packet is a network printer, and the flow advances to step S1507. If the object ID is next to the ID indicating hrPrinterDetectedErrorState or if the value in an error status field 713 indicates the absence of object (noSuchObject), it is determined that the device which has transmitted the trap packet is not a printer, and the flow advances to step S1508.

In step S1507, the network address of the device which has transmitted the trap packet, a flag indicating that the device is a printer, and the value of hrPrinterDetectedErrorState.X acquired in step S1506 are registered in the directory server (LDAP server) connected in step S1501.

Figure 16:
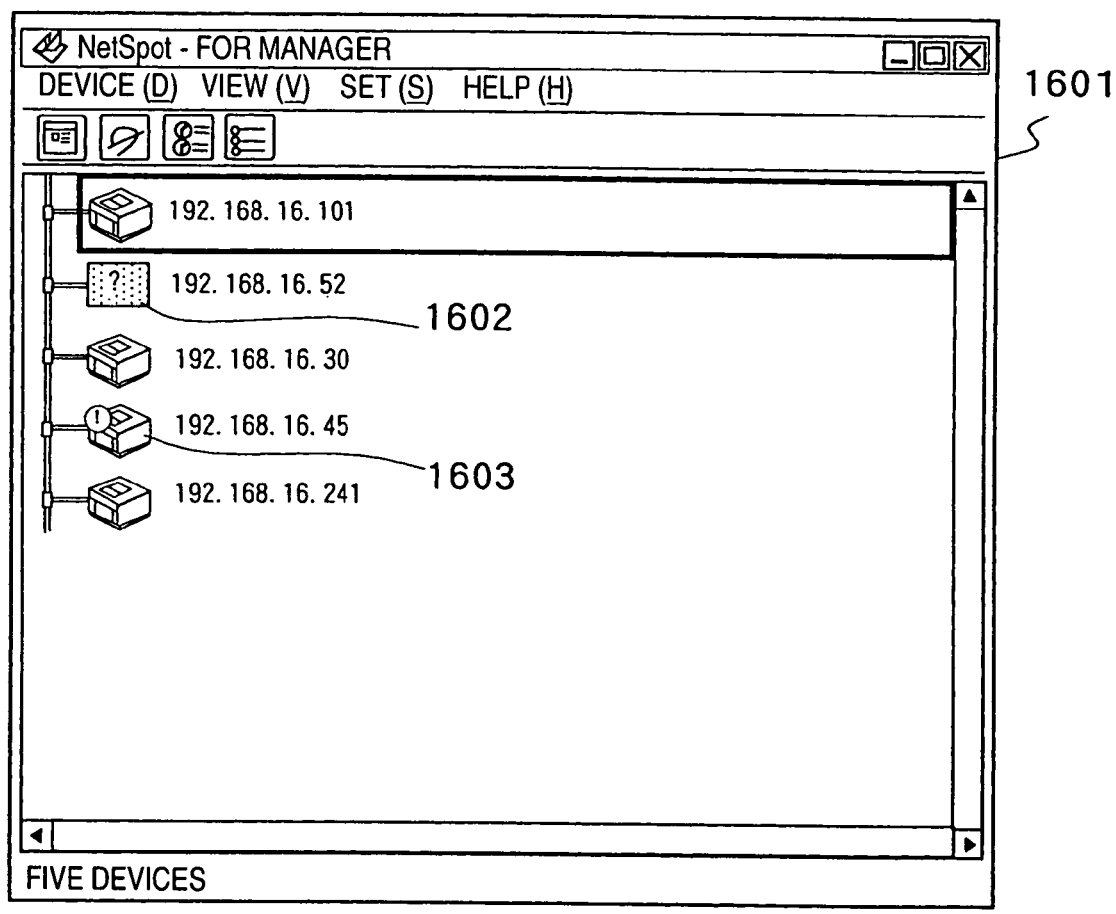
FIG. 16 is a view showing the way a device list is displayed in the second embodiment.

FIG. 16 is a view showing the way the client 1101 displays the information registered in step S1507. The display procedure is identical with that explained in FIG. 13, so a detailed description thereof will be omitted.

Differences from the device information shown in FIG. 13 are that an icon indicates that the device is a printer and information concerning the status of the device is added. For example, an icon 1603 shows that some warning error is occurring in the device. An icon 1602 indicates whether the type of device is a printer is unverified. As described above, the trap monitoring program captures a cold start trap which a device on the network broadcasts upon activation to acquire the address of the device, and inquires of the device having that address about its status. In accordance with a response to this inquiry, the trap monitor registers the status of the device obtained together with the address in the directory server. This allows the trap monitor to grasp the addresses of devices connected to the network without actively searching for these devices. This obviates the need for any active search packet issue by the device managing apparatus and reduces the traffic of the network. In addition, since the status of a device is inquired, the type and operating state of the device can be registered in the directory. Hence, the user can acquire more detailed information.

Figure 1:
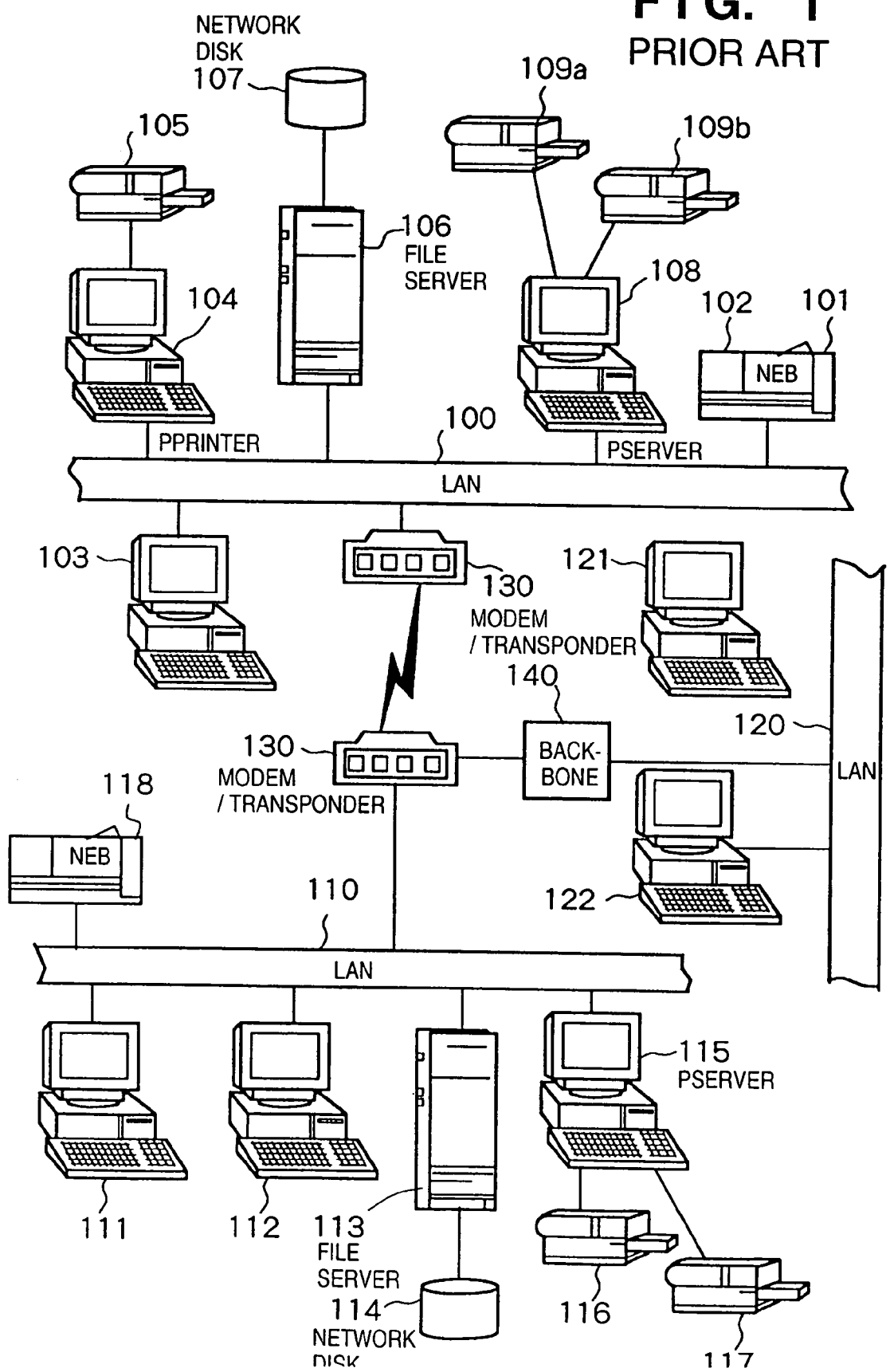
FIG. 1 is a view showing an arrangement in which a network board for connecting a printer to a network is connected to a printer having an open architecture.
Figure 2:
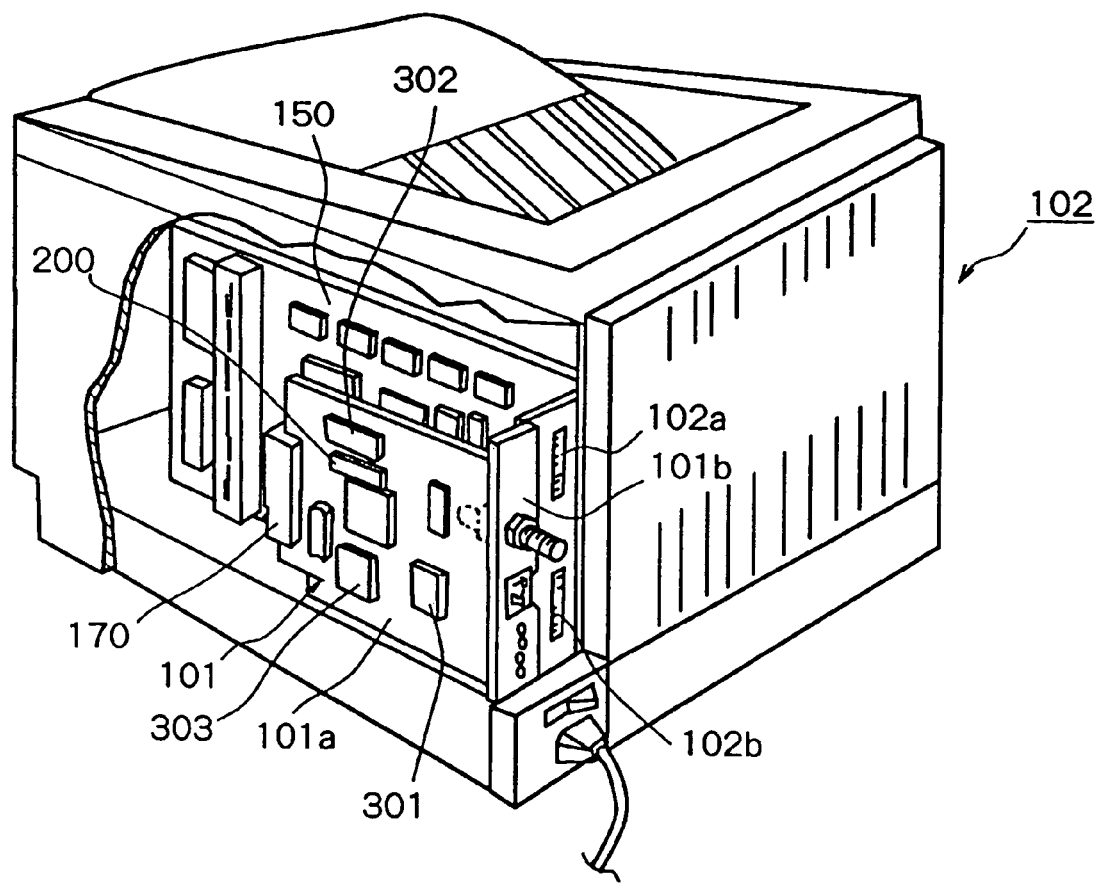
FIG. 2 is a sectional view showing prior art in which a network board mounted with an agent is connected to a printer.
Figure 3:
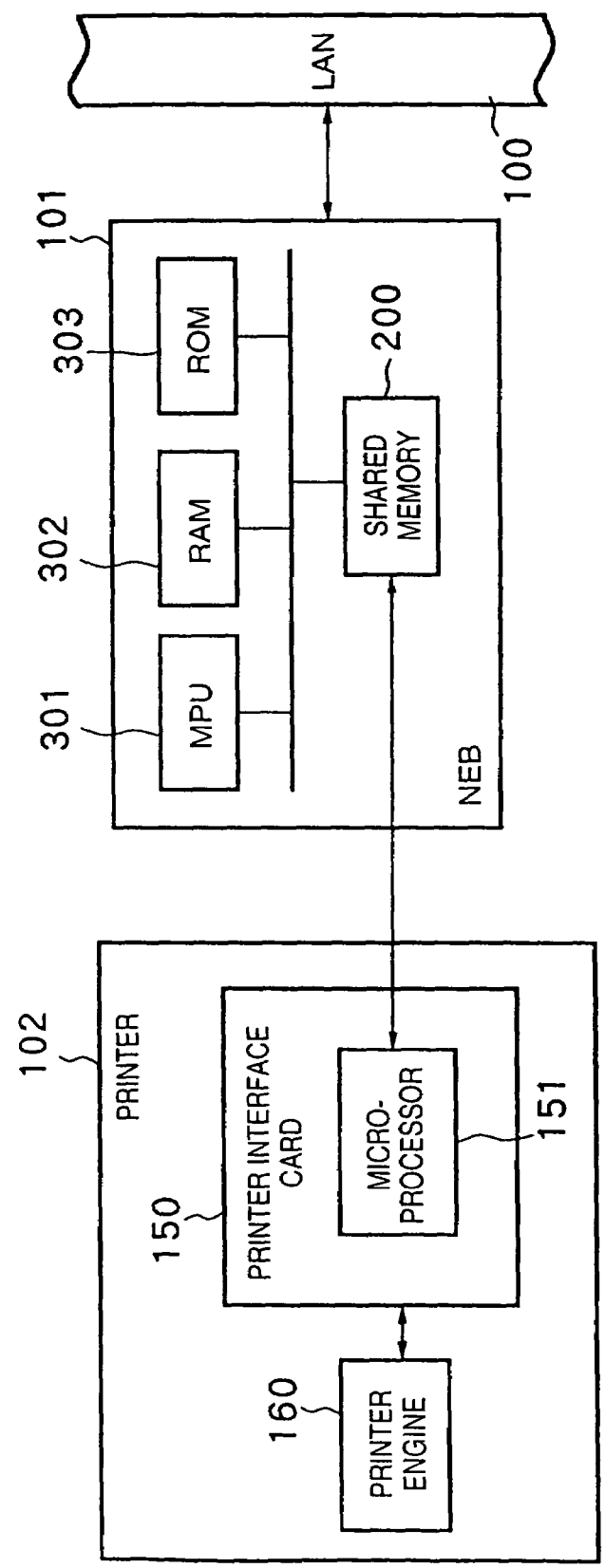
FIG. 3 is a block diagram showing the electrical connections between the network board, the printer, and a LAN.
Figure 4:
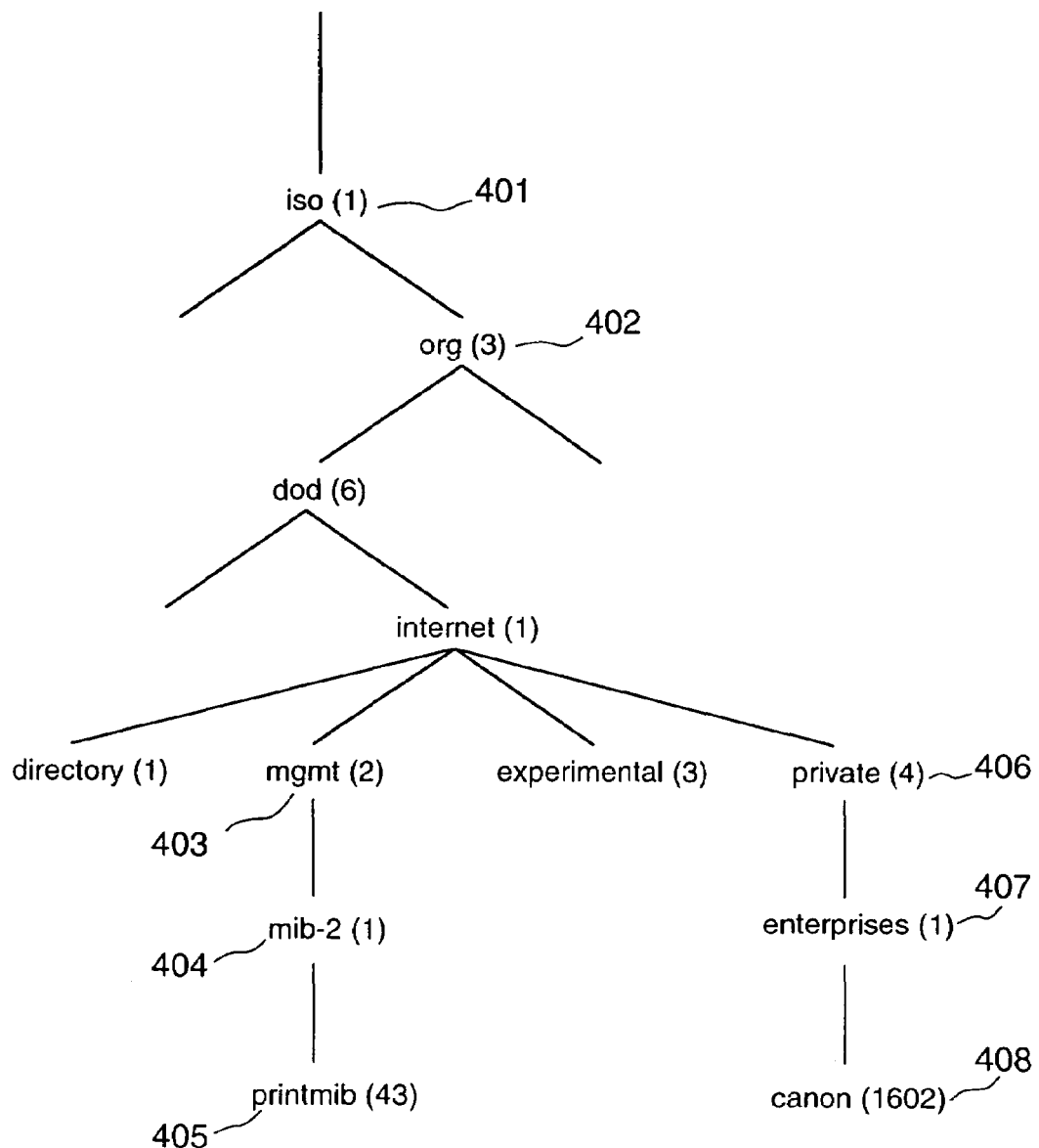
FIG. 4 is a view showing the concept of an MIB structure.
Figure 5:
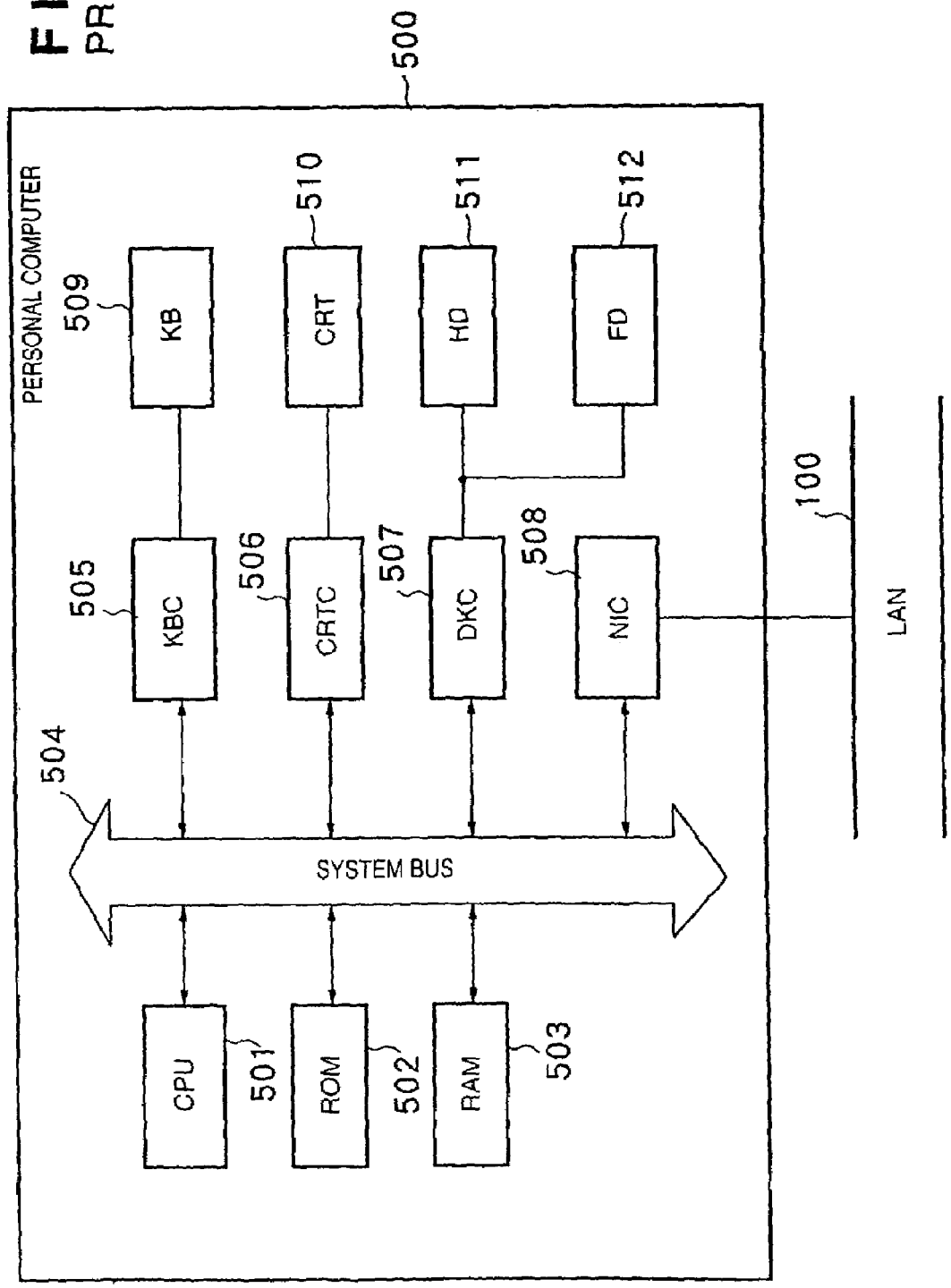
FIG. 5 is a block diagram showing the configuration of a PC in which network management software is operable.
Figure 6:
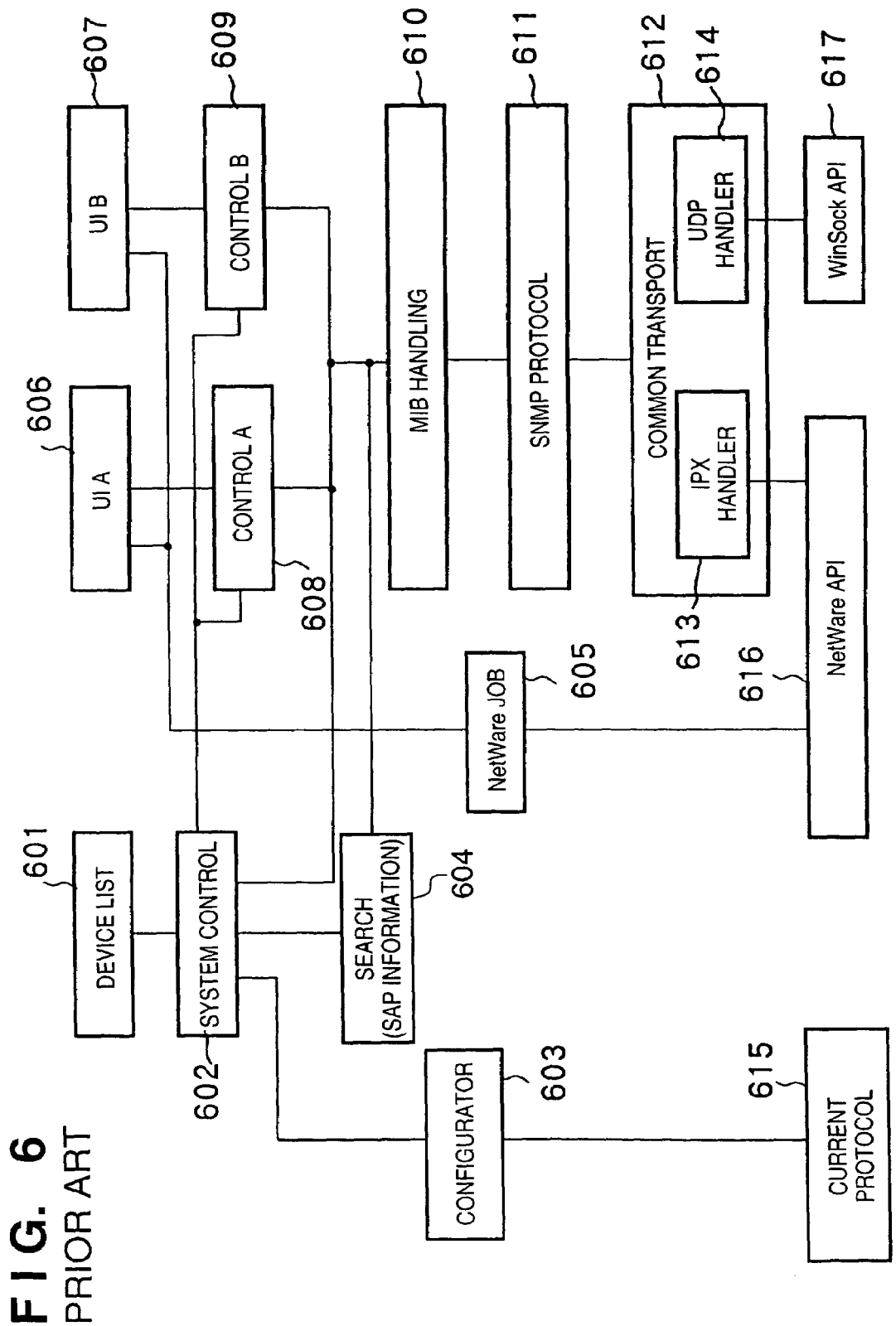
FIG. 6 is a view showing the module configuration of the network management software.

The network device search program according to the present invention as described above can also be executed by a PC 500 shown in FIG. 5 in accordance with an externally installed program. In this case, the program is loaded into the PC 500 together with pieces of information including the program from an external storage medium such as a CD-ROM, a flash memory, or a floppy disk, or via a network such as e-mail or personal computer communication. The present invention is applied to a case in which the program is thus supplied to the PC 500 from a storage medium.

Figure 17:
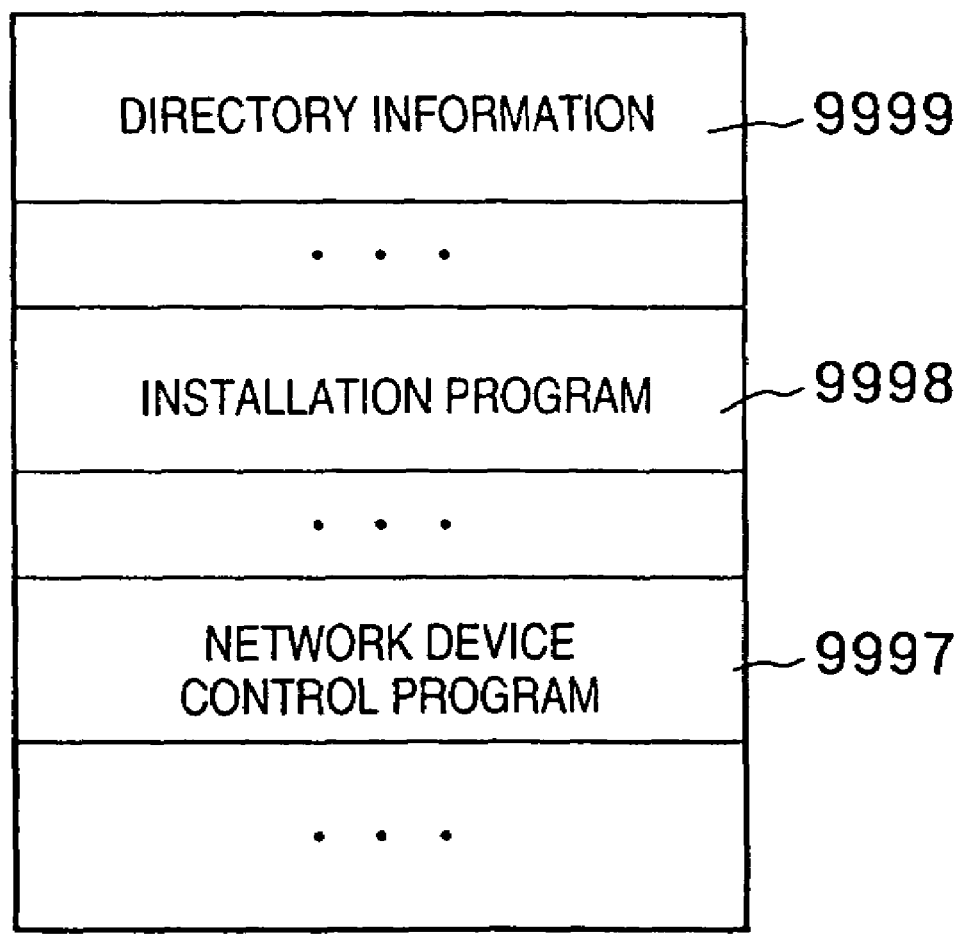
FIG. 17 is a view showing a memory map in a storage medium of network management software of the present invention.

FIG. 17 is a view showing the memory map of a CD-ROM as an example of a storage medium. A directory information area 9999 stores directory information and indicates the positions of an area 9998 storing the subsequent installation program and an area 9997 storing the network device search program.

The program area 9998 is an area storing the installation program. The network device control program area 9997 is an area storing the network device control program.

When the network search program of the present invention is to be installed in the PC 500, the installation program stored in the area 9998 is loaded into the system and executed by the CPU 501. This installation program executed by the CPU 501 reads out the network device search program from the area 9997 and stores the readout program in a hard disk 511.

The present invention can be applied to a system or integrated apparatus constituted by a plurality of devices (e.g., a host computer, an interface, and a reader) or to an apparatus comprising a single device.

Further, the object of the present invention can also be achieved by providing a system or an apparatus with a storage medium which stores program codes of the procedure, described in FIG. 12, 13, or 15, for performing the aforesaid functions of the embodiments, and reading out and executing the program codes stored in the storage medium by a computer (or a CPU or MPU) of the system or apparatus.

In this case, the program codes read from the storage medium realize the novel functions of the present invention, and the storage medium storing these program codes constitutes the invention.

Further, as the storage medium for providing the program codes, it is possible to use, e.g., a floppy disk, a hard disk, an optical disk, a magnetooptical disk, a CD-ROM, a CD-R, a magnetic tape, a nonvolatile memory card, and a ROM.

Furthermore, besides aforesaid functions according to the above embodiments are realized by executing the program codes which are read by a computer, the present invention includes a case where an OS or the like working on the computer performs a part or the whole of actual processing on the basis of instructions by the program codes and realizes the functions of the above embodiments.

Furthermore, the present invention also includes a case where, after the program codes read out from the storage medium are written in a memory of a function extension board inserted into the computer or of a function extension unit connected to the computer, a CPU or the like of the function extension board or function extension unit performs a part or the whole of actual processing on the basis of instructions from the program codes and realizes the functions of the above embodiments.

Note that the present invention is also applicable to a case where the program of software for achieving the functions of the aforementioned embodiments is delivered from a storage medium recording the program codes of the program to the user via a communication line such as personal computer communication.

In the present invention as has been described above, the device managing apparatus can acquire information of a network device without actively transmitting a broadcast packet. This can prevent an increase in the load of the network caused by device search.

As many apparently widely different embodiments of the present invention can be made without departing from the spirit and scope thereof, it is to be understood that the invention is not limited to the specific embodiments thereof except as defined in the appended claims.

What is claimed is:

1. A network device managing apparatus for managing a network to which a device which broadcasts a network managing packet at least once after activation is connected, comprising:
   packet receiving means for receiving a broadcast packet which is broadcast from the device when the device is activated;
   packet determining means for determining whether the broadcast packet received by said packet receiving means is a network managing packet;
   device address acquiring means for acquiring from the broadcast packet an address of the device which has transmitted the broadcast packet, if said packet determining means determines that the broadcast packet is a network managing packet; and
   device address registering means for registering the device address acquired by the device address acquiring means.

2. The apparatus according to claim 1, further comprising transmitting means for transmitting, to said device having the address acquired by said device address acquiring means, a verify packet for verifying that said device is a predetermined type of device, and
   if a response indicating that said device is a predetermined type of device is returned as a response to the verify packet, said device address registering means registers the status of said device which has returned the response together with the address.

3. The apparatus according to claim 2, wherein, the response to the verify packet contains information indicating the operating status of said device.

4. The apparatus according to claim 2, wherein, the verify packet is a packet for acquiring the status of a printer, and, if a response indicating that said device is a printer is returned as a response to the verify packet, said device address registering means registers the address of said device and information indicating that said device is a printer.

5. The apparatus according to claim 1, further comprising display control means for controlling a display unit to display the address of said device registered by said device address registering means.

6. The apparatus according to claim 2, further comprising display control means for controlling a display unit to display the address of said device registered by said device address registering means together with the status of said device.

7. A network system comprising:
   a network device for broadcasting a network managing packet at least once after activation;
   a device information server for storing information concerning a device connected to a network; and
   a network device managing apparatus, comprising:
   packet receiving means for receiving a broadcast packet which is broadcast from the network device when the network device is activated;
   packet determining means for determining whether the broadcast packet received by said packet receiving means is a network managing packet;
   device address acquiring means for acquiring from the broadcast packet the address of the network device which has transmitted the broadcast packet, if said packet determining means determines that the broadcast packet is a network managing packet; and
   device address registering means for registering the device address acquired by the device address acquiring means in said device information server.

8. The system according to claim 7, wherein, said network device managing apparatus further comprises transmitting means for transmitting, to said network device having the address acquired by said device address acquiring means, a verify packet for verifying that said network device is an object of monitoring, and
   if a response indicating that said network device is an object of monitoring is returned as a response to the verify packet, said device address registering means registers the status of said network device which has returned the response together with the address.

9. The system according to claim 8, wherein, the response to the verify packet contains information indicating the operating status of said network device.

10. The system according to claim 8, wherein, the verify packet is a packet for acquiring the status of a printer, and, if a response indicating that said network device is a printer is returned as a response to the verify packet, said address registering means registers the address of said network device as a source of response and information indicating that said network device is a printer.

11. The system according to claim 7, further comprising display means for displaying the address of said network device registered by said address registering means.

12. The system according to claim 8, further comprising display means for displaying the address of said network device registered by said address registering means together with the status of said network device.

13. A network device managing method of managing a network to which a device which broadcasts a network managing packet at least once after activation is connected, comprising the steps of:
   a packet receiving step of receiving a broadcast packet which is broadcast from the device when the device is activated;
   a packet determining step of determining whether the broadcast packet received in said packet receiving step is a network managing packet;
   a device address acquiring step of acquiring from the broadcast packet the address of a device which has transmitted the broadcast packet, if said packet determining step determines that the packet is a network managing packet; and
   a device address registering step of registering the device address acquired by the device address acquiring step.

14. The method according to claim 13, further comprising a transmitting step of transmitting, to said device having the address acquired in said device address acquiring step, a verify packet for verifying that said device is an object of monitoring, and
   if a response indicating that said device is an object of monitoring is returned as a response to the verify packet, said device address registering step comprises registering the status of said device which has returned the response together with the address.

15. The method according to claim 14, wherein, the response to the verify packet contains information indicating the operating status of said device.

16. The method according to claim 14, wherein, said verify packet is a packet for acquiring the status of a printer, and, if a response indicating that said device is a printer is returned as a response to the verify packet, said address registering step comprises registering the address of said device as a source of response and information indicating that said device is a printer.

17. The method according to claim 13, further comprising a display step of displaying the address of said device registered in said address registering step.

18. The method according to claim 14, further comprising a display step of displaying the address of said device registered in said address registering step together with the status of said device.

19. A computer-readable storage medium storing a computer program for implementing the network device managing method according to claim 13 by a computer.

20. The apparatus according to claim 1, wherein, said device address registering means registers the device address in an external managing apparatus connected via the network.

21. The apparatus according to claim 1, further comprising device address transmitting means for transmitting the address of said device registered by said device address registering means to an external client apparatus connected via the network.

22. The apparatus according to claim 1, wherein, the network managing packet is an SNMP trap packet.

23. A network device managing apparatus for managing a network to which a device which broadcasts a network managing packet at least one after activation is connected, comprising:
   a network interface circuit; and
   a trap monitor for (i) receiving, via the network interface circuit, a broadcast packet which is broadcast from the device when the device is activated, (ii) determining whether the broadcast packet received by said network interface circuit is a network managing packet, (iii) acquiring from the broadcast packet the address of the device which has transmitted the broadcast packet if it is determined that the broadcast packet is a network managing packet, and (iv) registering the acquired device address.

24. A network device managing apparatus for managing a network to which a device which broadcasts a network managing packet at least once after activation is connected, comprising:
   packet recognizing means for recognizing a broadcast packet received from the network;
   packet determining means for determining whether the broadcast packet recognized by said packet recognizing means is a network managing packet;
   device address acquiring means for acquiring from the broadcast packet the address of the device which has transmitted the broadcast packet if said packet determining means determines that the broadcast packet is a network managing packet; and
   device address registering means for registering the acquired device address to an external managing apparatus on the network.

25. The apparatus according to claim 24, wherein said device address registering means registers the device address to said external managing apparatus which is implemented in accordance with Lightweight Directory Access Protocol.

26. A network device managing apparatus for managing a network to which a device which broadcasts a network managing packet at least once after activation is connected, comprising:
   a network interface circuit; and
   a trap monitor for (i) recognizing a broadcast packet received from the network via the network interface circuit, (ii) determining whether the broadcast packet received by said network interface circuit is a network managing packet, (iii) acquiring from the broadcast packet the address of the device which has transmitted the broadcast packet if it is determined that the broadcast packet is a network managing packet, and (iv) registering the device address to an external managing apparatus on the network.

27. A network device managing apparatus for managing a network to which a device which broadcasts a network managing packet at least once after activation is connected, comprising:
   packet receiving means for receiving a broadcast packet which is broadcast from the device when the device is activated;
   packet determining means for determining whether the broadcast packet received by said packet receiving means is a predetermined trap packet which is defined to notify of participation of the device on the network to the network managing device;
   device information acquiring means for acquiring, from the broadcast packet, device identification information including an address of the device which has transmitted the broadcast packet if said packet determining means determines that the broadcast packet is the predetermined trap packet which notifies of the participation of the network device; and device information registering means for registering the device identification information acquired by the device information acquiring means.

28. An apparatus according to claim 27, wherein the predetermined trap packet is a trap packet defined by Simple Network Management Protocol.

29. An apparatus according to claim 27, said device information registering means registers the device identification information acquired by acquiring means to an external server apparatus.

30. An apparatus according to claim 29, wherein the external server apparatus has a data base and device information registering means which registers the device address acquired by the device information acquiring means to the data base in accordance with a Light Weight Discovery Protocol.

31. A network device managing method for managing a network to which a device which broadcasts a network managing packet at least once after activation is connected, comprising:

a packet receiving step of receiving a broadcast packet which is broadcast from the device when the device is activated;

a packet determining step of determining whether the broadcast packet received in said packet receiving step is a predetermined trap packet which is defined to notify of participation of the device on the network to the network managing device;

a device information acquiring step of acquiring, from the broadcast packet, device identification information including an address of the device which has transmitted the broadcast packet if it is determined in said packet determining step that the broadcast packet is the predetermined trap packet which notifies of the participation of the network device; and a device information registering step of registering the device identification information acquired in the device information acquiring step.

32. A method according to claim 31, wherein the predetermined trap packet is a trap packet defined by Simple Network Management Protocol.

33. A method according to claim 31, wherein said device information registering step registers the device identification information acquired by acquiring means to an external server apparatus.

34. A method according to claim 33, wherein the external server apparatus has a data base and further performs a device information registering step of registering the device address acquired in the device information acquiring step to the data base in accordance with a Light Weight Discovery Protocol.

35. A network device managing apparatus for managing a network to which a device which broadcasts a network managing packet at least once after activation is connected, comprising:

a packet receiving unit adapted to receive a broadcast packet which is broadcast from the device when the device is activated;

a packet determining unit adapted to determine whether the broadcast packet received by said packet receiving unit is a predetermined trap packet which is defined to notify of participation of the network device on the network to the network managing device;

a device information acquiring unit adapted to acquire, from the broadcast packet, device identification information including an address of the device which has transmitted the broadcast packet if said packet determining unit determines that the broadcast packet is the predetermined trap packet which notifies of the participation of the network device; and a device information registering unit adapted to register the device identification information acquired by said device information acquiring unit.

* * * * *

UNITED STATES PATENT AND TRADEMARK OFFICE
CERTIFICATE OF CORRECTION

PATENT NO. : 6,981,036 B1
APPLICATION NO. : 09/588672
DATED : December 27, 2005
INVENTOR(S) : Noboru Hamada It is certified that error appears in the above-identified patent and that said Letters Patent is hereby corrected as shown below:

COLUMN 1:
Lines 47-48, "having higher commonness" should read -- in common use --.

COLUMN 10:
Line 3, "less" should read -- few --.

COLUMN 18:
Line3, "one" should read -- once --.

Signed and Sealed this

Nineteenth Day of December, 2006

JON W. DUDAS
*Director of the United States Patent and Trademark Office*